May 8, 1962
F. T. LEE
3,033,064
SUPPORT AND STRIPPER FOR CUTTER HEAD IN
A PAPER SHREDDING MACHINE
Filed Jan. 12, 1959
2 Sheets-Sheet 1
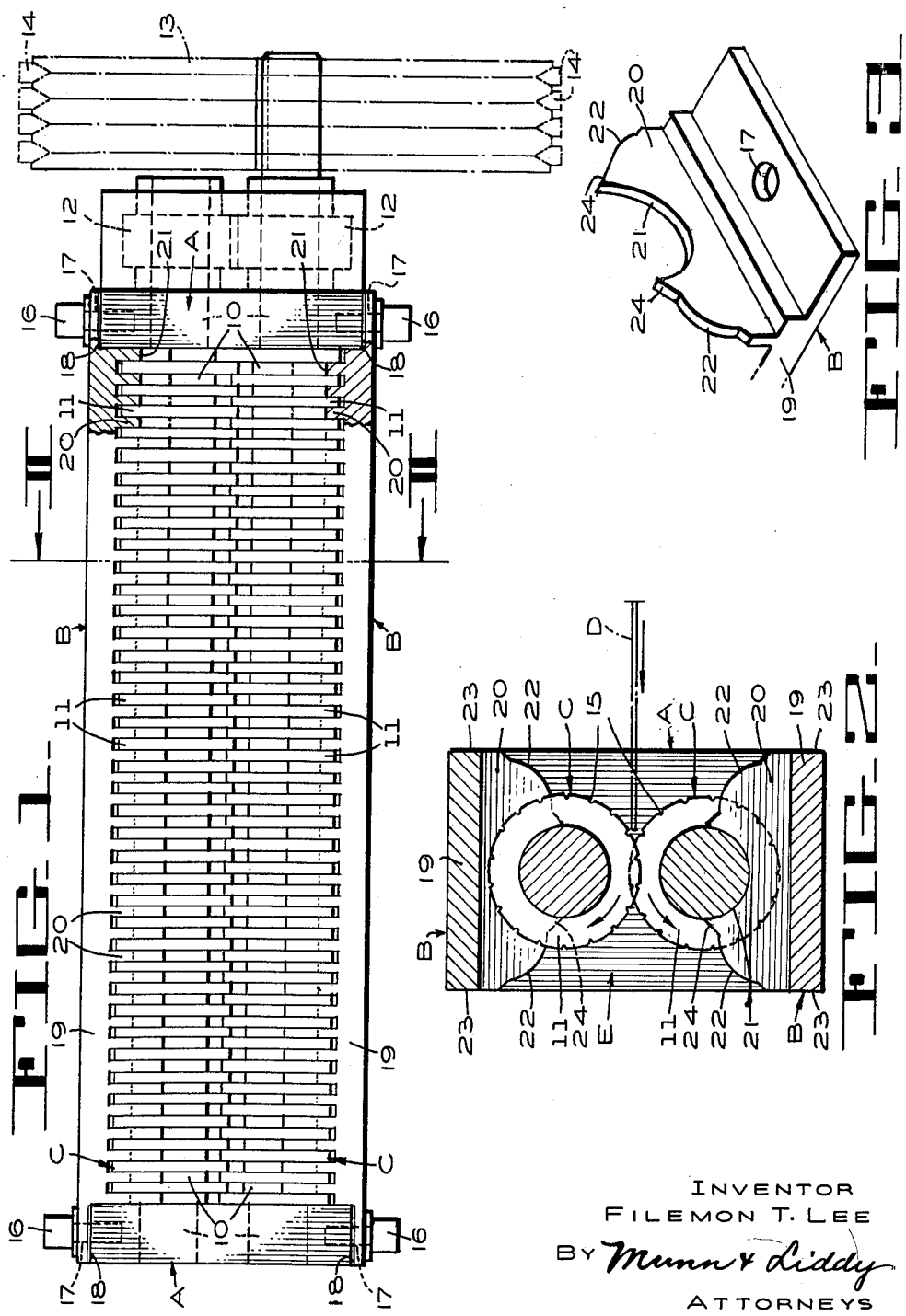
INVENTOR
FILEMON T. LEE
BY Munn & Liddy
ATTORNEYS

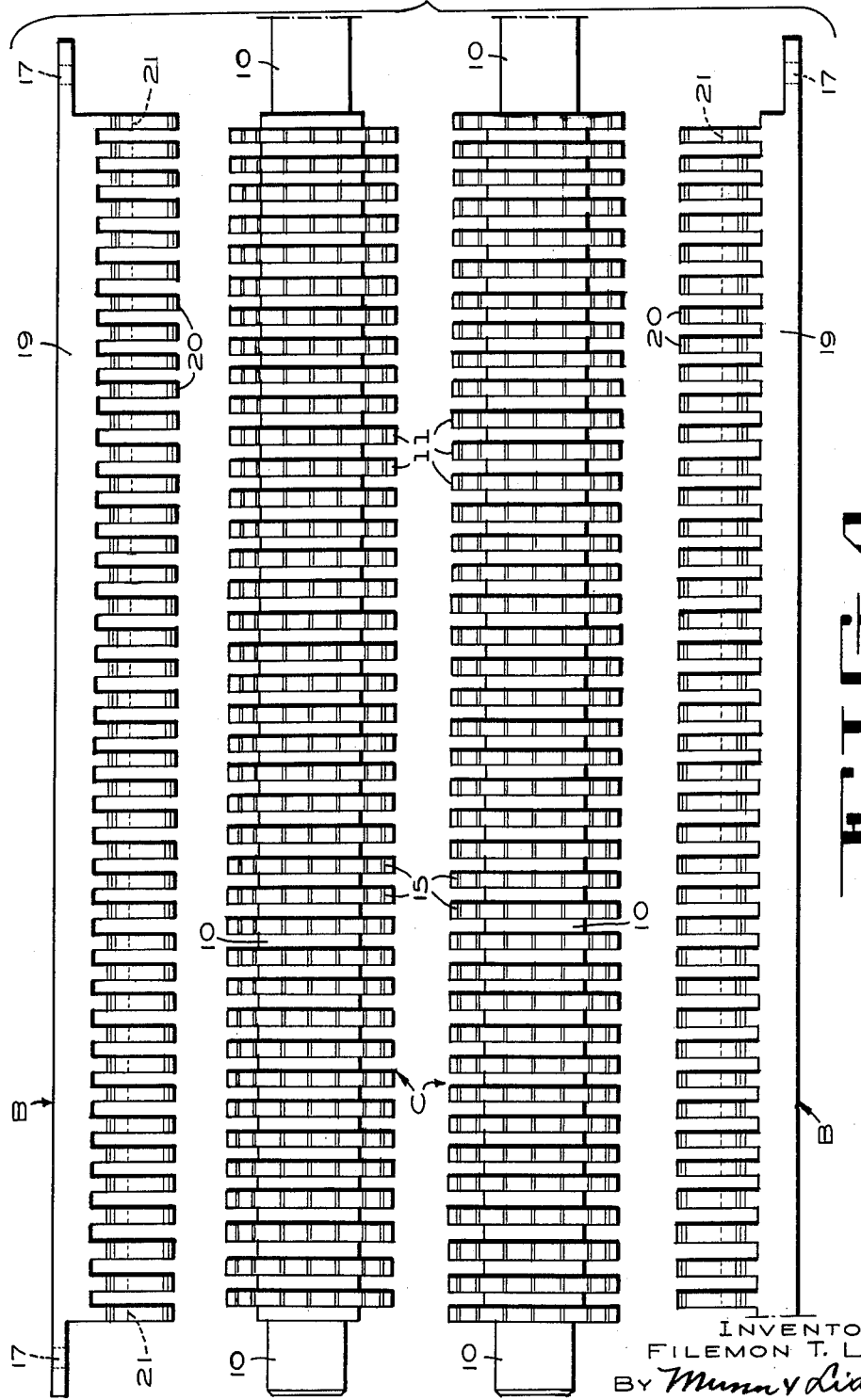

United States Patent Office 3,033,064
Patented May 8, 1962

3,033,064
SUPPORT AND STRIPPER FOR CUTTER HEAD IN A PAPER SHREDDING MACHINE
Filemon T. Lee, 441 Minna St., San Francisco, Calif.
Filed Jan. 12, 1959, Ser. No. 786,387
3 Claims. (Cl. 83—114)

The present invention relates to improvements in a cutter head for a paper shredding machine. It consists of the combinations, constructions, and arrangement of parts, as hereinafter described and claimed. It has particular reference to improvements over my United States Letters Patents Nos. 2,621,567 and 2,770,302.

In my United States Patent No. 2,621,567 on a "Paper Shredding Machine," dated December 16, 1952, there is shown a pair of shearing rollers having disc cutters thereon, which are arranged to cut sheets of papers into strips. Moreover, transversely-arched combs are associated with the rollers so as to remove the cut strips of paper therefrom. The combs for the two shafts of the shearing rollers define crowns that are disposed between the two shafts. In actual practice, it has been found that the foreign matter resulting from the cutting of the paper will become jammed the crown portions of the combs and the shafts of the rollers, forcing the combs away from the shafts of the shearing rollers. This has resulted in the comb associated with one of the rollers being worn and damaged by coming into contact with the disc cutters on the other shearing roller, and further resulting in the breaking of the teeth of the combs. This not only required the replacing of the teeth, but also required the removal of the accumulated foreign matter from the shearing rollers from time to time by using a chisel.

In United States Patent No. 2,770,302 on a "Machine for Shredding Paper or the Like Into Strips," dated November 13, 1956, the two shafts of the shearing rollers were supported in spacer-bearing rings, each of these rings being mounted in individual plate-like combs. The comb plates were assembled on retaining rods to hold them from turning. This construction required the cutter head to be taken apart when replacing one or more of the rings or comb plates, consuming a great deal of time and labor in making repairs.

As the cardinal object of the present invention, it is proposed to provide a cutter head for a paper shredding machine in which a pair of rigid combs are mounted so as to support the shafts of the shearing rollers. Each comb has a rigid base bar having a series of spaced teeth formed integral therewith, and each tooth is fashioned with a substantially semi-cylindrical bearing. All of these bearings contact with the shafts with a sufficient snug fit as to preclude the foreign matter resulting from the cutting of the paper from gaining access between the shafts and the bearings. Moreover, each comb may be withdrawn as a unit in a lateral direction relative to the roller with which it is associated, and without disturbing the latter. These combs may be reversed end for end so as to position new portions of the teeth in a position to guide the cut strips of paper from the rollers after other portions of the teeth have become worn. This arrangement will prolong the useful life of the combs.

Other objects and advantages will appear as the specification proceeds. The novel features of the invention will be pointed out in the claims hereunto annexed.

Drawings

For a better understanding of my invention, reference should be had to the accompanying drawings, forming part of this specification, in which:

FIGURE 1 is a front elevational view of my cutter head for a paper shredding machine, portions being shown in section;

FIGURE 2 is a transverse sectional view taken along the plane II—II of FIGURE 1;

FIGURE 3 is an isometric view looking at one end of a comb, the view being fragmentary; and FIGURE 4 is an elevational view disclosing the shearing rollers and the combs arranged in spaced relation with one another.

While I have shown only the preferred form of my invention, it should be understood that various changes, or modifications, may be made within the scope of the annexed claims without departing from the spirit thereof.

Detailed Description

Referring to the drawings in detail, I have shown a pair of spaced end plates A which are arranged parallel with one another, as disclosed in FIGURE 1. A pair of rigid combs B are secured to the end plates A. The end plates and the combs coact to define a rectangular-shaped supporting frame (see FIGURE 1). Moreover, a pair of shearing rollers C are arranged in parallel relation with each other and are disposed within the confines of the supporting frame, with the combs B straddling the shearing rollers C and with the combs extending lengthwise of the rollers.

It will be noted that each shearing roller C defines a shaft 10 which is journalled in the end plates A for rotation. The shaft 10 of each roller C has a series of spaced disc cutters 11 thereon which are rotatable therewith. As shown, the disc cutters 11 are formed integral with the shafts 10, and are preferably case hardened so as to withstand wear. The cutters 11 on one shaft are arranged in interdigitating relation with the cutters on the shaft, whereby the disc cutters will cut sheets of paper D into strips, when the sheets are fed between the shearing rollers C, as suggested in FIGURE 2 of the drawings.

In FIGURE 1 there is shown a pair of gears 12, which are secured to the shafts 10 and intermesh with one another. When one of the shafts 10 is rotated, such as by means of a driven pulley 13 and belts 14, the gears 12 will cause the shafts 10 to turn in opposite directions. The peripheries of the disc cutters 11 may be fashioned with notches 15 therein so as to aid in drawing the paper between the shearing rollers. FIGURE 2 illustrates that the disc cutters 11 on one roller have peripheral portions overlapping peripheral portions of the other roller so as to shear the papers D into strips. Although the rollers C are shown as being disposed one above the other in FIGURE 1, it is obvious that the supporting frame could be turned so that the rollers would be disposed in a horizontal plane, or at any desired inclined plane.

For the purpose of removably securing the combs B to the end plates A, I have shown cap screws 16 that pass through openings 17 formed in the end portions of the combs so as to be threaded into the end plates. Shims 18 of suitable thicknesses may be interposed between the combs and the end plates, as suggested in FIGURE 1.

In its structural features, each comb B defines a rigid base bar 19 having a series of spaced teeth 20 formed integral with the bar. The teeth 20 on each comb project into the spaces between the disc cutters 11 of one of the shearing rollers C to remove the cut strips of paper therefrom. Each tooth 20 is fashioned with a substantially semi-cylindrical bearing 21. All of the bearings 21 of each comb B contact with one of the shafts 10 with a sufficient snug fit to preclude foreign matter resulting from the cutting of the paper D from gaining access between the shaft and the bearings. It will be apparent that the bearings 21 of each comb B support the adjacent shaft 10 from only one side of the latter, and thus each comb may be withdrawn as a unit in a lateral direction relative to the adjacent roller C without disturbing the latter.

Each tooth 20 has a pair of sloping sides 22 that diverge relative to one another from positions adjacent to the semi-cylindrical bearings 21. One of the sloping sides 22 of each tooth, i.e., at the left-hand side of FIGURE 2, is disposed to remove the cut strips of paper and guide the latter from the shearing roller. The sloping sides 22 of the teeth are identical with one another, whereby the combs B may be reversed end for end so as to present new sloping sides 22 in a position to guide the cut strips of paper from the rollers C on the discharge side of the latter, after the other sloping sides 22 of the teeth have become worn. This will prolong the useful life of each comb materially.

As shown in FIGURE 2, each base bar 19 defines opposite lateral edges 23. Each of the sloping sides 22 of each tooth 20 extends to one of the lateral edges 23 of the base bar so that the side edges of the teeth at the discharge side of the rollers will guide the cut strips of paper D over a lateral side of the base bar without obstruction by the latter. Any foreign matter resulting from the cutting of the paper will escape from the cutters 11 through the large opening or window E, which is defined by the end plates A and the combs B (see FIGURE 2). Small projections 24 on the sloping sides of the teeth 20 have points disposed in contact with the shafts 10 so as to direct the cut strips of paper away from the bearings 21.

When the teeth 20 are worn on both sides of the shafts 10, the comb B may be removed by taking out the cap screws 16 and inserting a new comb, all without disturbing the shearing rollers. In actual practice, the disc cutters 11 are made about five times as hard as the teeth 20, but I do not desire to be limited in this respect.

The notches 15 will grab paper clips and cut the latter as the clips pass between the shearing rollers C. If the disc cutters 11 had smooth peripheries and both rollers C were disposed in the same horizontal plane, the clips would ride on the cutters and prevent these cutters from shredding the paper.

I claim:

1. In a cutter head for a paper shredding machine: a shearing roller defining a shaft having a series of spaced disc cutters thereon which are rotatable therewith; the cutters being arranged along the length of the shaft; a rigid comb mounted to extend lengthwise of the roller; the comb defining a base bar having a series of spaced teeth disposed along the length of and being formed integral with the bar; these teeth projecting into the spaces between the disc cutters to remove strips of paper cut by the cutters; each tooth being fashioned with a substantially semi-cylindrical bearing; all of the bearings of the teeth contacting with the shaft with a sufficiently snug fit to preclude foreign matter resulting from the cutting of the paper from gaining access between the shaft and the bearings; the bar having a sufficient number of teeth so that a tooth will project into the space between each adjacent pair of cutters, whereby the bearings of the teeth will support the shaft throughout that part of the length of the shaft on which the cutters are disposed, and thereby hold the shaft against flexing laterally in one direction during cutting operations; said teeth being formed with an axial dimension such that they occupy substantially the entire space between adjacent cutters; the bearings supporting the shaft from only one side of the shaft, whereby the comb may be withdrawn as a unit in a lateral direction relative to the roller without disturbing the latter.

2. The cutter head for a paper shredding machine, as set forth in claim 1; and in which each tooth has a pair of sloping sides that diverge relative to one another from positions adjacent to the semi-cylindrical bearing; one of the sloping sides of each tooth being disposed to remove cut strips of paper and guide the latter from the shearing roller; the sloping sides of the teeth being identical with one another, whereby the comb may be reversed end for end so as to simultaneously present new sloping sides on all of the teeth in a position to guide the cut strips of paper from the roller after the other sloping sides of the teeth have become worn.

3. The cutter head for a paper shredding machine, as set forth in claim 1; and in which the base bar has a lateral edge on that side of the roller on which the cut strips of paper are discharged; each tooth having a sloping side extending from the shaft to said lateral edge of the base bar, whereby the sloping sides of the teeth will guide the discharged strips over said lateral edge of the base bar without obstruction by the latter.

References Cited in the file of this patent

UNITED STATES PATENTS

| | | |
|---|---|---|
| 119,578 | Crocker | Oct. 3, 1871 |
| 595,092 | Bosley | Dec. 7, 1897 |
| 740,201 | Stimpson | Sept. 29, 1903 |
| 1,380,723 | Kupfer | June 7, 1921 |
| 2,621,567 | Lee | Dec. 16, 1952 |
| 2,770,302 | Lee | Nov. 13, 1956 |
| 2,923,259 | Malnati | Feb. 2, 1960 |